(12) United States Patent
Duffy et al.

(10) Patent No.: US 11,113,190 B2
(45) Date of Patent: Sep. 7, 2021

(54) MUTABLE TYPE BUILDER

(71) Applicant: Microsoft Technology Licensing, LLC, Redmond, WA (US)

(72) Inventors: John J. Duffy, Mercer Island, WA (US); Krzysztof J. Cwalina, Redmond, WA (US); Matthew G. Ellis, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 614 days.

(21) Appl. No.: 15/349,747

(22) Filed: Nov. 11, 2016

(65) Prior Publication Data

US 2018/0137049 A1    May 17, 2018

(51) Int. Cl.
*G06F 12/02*    (2006.01)
*G06F 8/41*    (2018.01)

(52) U.S. Cl.
CPC .......... *G06F 12/0253* (2013.01); *G06F 8/447* (2013.01); *G06F 12/023* (2013.01); *G06F 2212/702* (2013.01)

(58) Field of Classification Search
CPC .. G06F 16/27; G06F 11/1441; G06F 12/0223; G06F 12/0246; G06F 30/39; G06F 15/16; G06F 12/0253
See application file for complete search history.

(56) References Cited

U.S. PATENT DOCUMENTS

| | | | |
|---|---|---|---|
| 6,823,467 B1 * | 11/2004 | Cantrill | G06F 13/24 710/260 |
| 7,822,938 B2 | 10/2010 | Dussud et al. | |
| 8,453,015 B2 | 5/2013 | Ponnuswamy | |
| 8,701,095 B2 | 4/2014 | Stephens | |
| 8,924,437 B2 | 12/2014 | Seth et al. | |
| 8,972,629 B2 | 3/2015 | Printezis et al. | |
| 9,052,883 B2 | 6/2015 | Lue-Sang et al. | |
| 9,116,798 B2 | 8/2015 | Daynes et al. | |
| 9,176,769 B2 | 11/2015 | Raghunathan et al. | |
| 9,213,638 B1 | 12/2015 | Kumpera et al. | |
| 9,250,936 B2 | 2/2016 | Lin et al. | |
| 9,880,933 B1 * | 1/2018 | Gupta | G06F 12/0815 |
| 2006/0010303 A1 | 1/2006 | Wu et al. | |
| 2006/0242635 A1 | 10/2006 | Broussard et al. | |
| 2012/0221805 A1 * | 8/2012 | Hjul | G06F 9/5016 711/154 |

(Continued)

OTHER PUBLICATIONS https://www.codeproject.com/Articles/20910/Generic-Gap-Buffer Generic Gap Buffer—CodeProject, pp. 2-3, Jacob Slusser Oct. 25, 2007 (Year: 2007).*

(Continued)

*Primary Examiner* — Mariela Reyes
*Assistant Examiner* — Courtney Harmon
(74) *Attorney, Agent, or Firm* — Dicke, Billig & Czaja, PLLC

(57) ABSTRACT

A computing device implemented method for building a mutable type is disclosed. A data structure is generated in a contiguous section of memory. The data structure includes an element portion and an over-allocation portion. The element portion stores elements accessible with an index. A gap object is inserted into the over-allocation portion. The gap object is garbage collected.

20 Claims, 3 Drawing Sheets

(56) References Cited

U.S. PATENT DOCUMENTS

| | | | | |
|---|---|---|---|---|
| 2013/0139133 | A1* | 5/2013 | Odaira | G06F 9/45516 717/148 |
| 2014/0089625 | A1* | 3/2014 | Assarpour | G06F 12/023 711/170 |
| 2015/0363174 | A1* | 12/2015 | Rose | G06F 9/44521 717/114 |
| 2016/0062954 | A1* | 3/2016 | Ruff | G06F 17/21 715/249 |
| 2018/0011787 | A1* | 1/2018 | Karlsson | G06F 12/0253 |

OTHER PUBLICATIONS

"Force garbage collection of arrays, C#", Published on: Apr. 11, 2013 Available at: http://stackoverflow.com/questions/1104352/force-garbage-collection-of-arrays-c-sharp (4 pgs.).

Schanzer, Emmanuel, "Performance Considerations for Run-Time Technologies in the .NET Framework", Published on: Aug. 2001 Available at: https://msdn.microsoft.com/en-us/library/ms973838.aspx.

"Implementing and Contigunng Dynamic Memory", Retrieved on: Jul. 1, 2016 Available at:http://www.google.co.in/url?sa=t&rct=j&q=&esrc=s&source=web&cd=1&ved=0ahUKEwi2rJuxxNvNAhUTSI8KHd4eA4IQFggeMAA&url=http%3A%2F%2Fdownload.microsoft.com%2Fdownload%2FD%2F1%2F5%2FD15951B6-B33C-4A57-BCFB-76A9A6E54212%2FImplementing_and_Configuring_Dynamic_Memory_WP_SP1_final.

"Fundamentals of Garbage Collection", Published on: Oct. 24, 2011 Available at: https://msdn.microsoft.com/en-us/library/ee787088%28v=vs.110%29.aspx (10 pgs.).

"International Search Report and Written Opinion Issued in PCT Application No. PCT/US2017/060077", dated Feb. 13, 2018, 9 Pages.

* cited by examiner

MUTABLE TYPE BUILDER

BACKGROUND

An array structure is a data structure having a collection of zero or more elements, such as values or variables, each identified with an index. An array structure is stored in memory, such as a contiguous section of the heap, having an address of the first element at a foundation address. The position of each element can be determined from the corresponding index tuple that can represent an element's relative position in the array structure. Array structures can be used to implement various data types including array types, strings, and some lists. For example, a string is commonly understood as a data type but is implemented in many computer languages as an array structure of bytes that store a sequence of characters in a form of character encoding. Array types can include a collection of elements selectable by one or more indices that can be computed at program run time. Data types having data members that can be modified after creation are referred to as mutable types.

SUMMARY

This summary is provided to introduce a selection of concepts in a simplified form that are further described below in the Description. This summary is not intended to identify key features or essential features of the claimed subject matter, nor is it intended to be used to limit the scope of the claimed subject matter.

Systems and methods for building a mutable type, such as an array type or a string type are disclosed. In one example, a data structure is generated in a contiguous section of memory such as a heap. The data structure includes an element portion and an over-allocation portion. The element portion stores elements accessible with an index. In one example, the over-allocation portion includes at least a selected over-allocation amount. A gap object is inserted into the over-allocation portion. The gap object is garbage collected. For example, the gap object mimics the sweep phase of a mark and sweep garbage collection.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

DESCRIPTION

Figure 1:
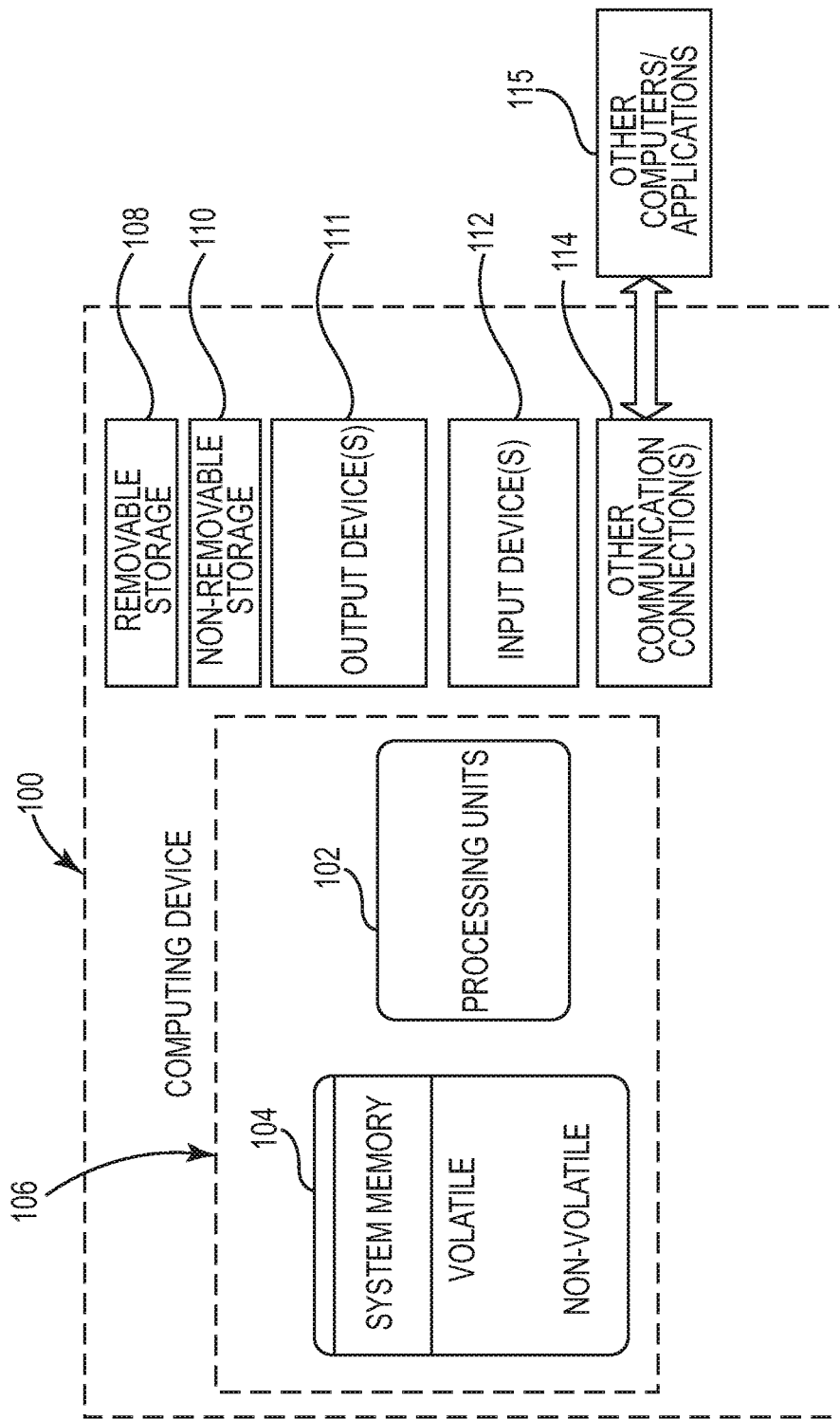
FIG. 1 is a block diagram illustrating an example of a computing device, which can be configured in a computer network to provide, for example, a cloud-computing environment.

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various exemplary embodiments described herein may be combined with each other, unless specifically noted otherwise.

Traditionally, the length of an array or string is established when the array is created. The length is immutable after creation and elements cannot be inserted or removed. Such immutable types offer thread safety, memory optimization, and other features.

Often, developers will want to create an array, list, or string but the number of data elements are not known at the start of the operation, or, in the case of a string, multiple concatenations are expected. Many programming languages provide support for mutable types including dynamic arrays, which are a random access, variable-size list data structure, or mutable strings that allows elements to be added or removed after creation. For example, the framework libraries under the trade designation Java and .Net framework libraries (from Oracle Corporation and Microsoft Corporation, respectively) supply the ArrayList class and the .Net framework library supplies the generic List<T> class to implement dynamic arrays. Also, the .Net framework libraries supply a class to append, remove, replace or insert characters to modify a string value of an instance.

In general, a dynamic array includes an array that occupies a contiguous block of memory on the heap having a fixed length, or capacity. During operation, elements are added and removed into the fixed-length contiguous block of memory. Once the block of memory is occupied with elements, a new and larger memory location of a fixed length is found on the heap, and the original array is copied to the new memory location.

The implementation of some mutable types in a software framework is inefficient. Once the operation has completed building the object, such as adding or removing data elements, the framework performs a final allocation of memory corresponding to the final size of the mutable type, copies the data elements into the new and correctly-sized memory block to fit the elements, and returns a new object. The copied data elements from the previous data structure are set for garbage collection, which creates additional garbage for the framework.

The present disclosure is directed to mutable types in a software framework library that allow a developer to efficiently build an array or string in which the size is not known in advance of the operation. In one example, the framework over allocates an internal buffer such that when the data elements are extracted, the framework converts the buffer into a data structure of a size corresponding with the amount of data elements. This avoids a post-operation memory allocation and copy of elements as well as garbage collection of the copied elements.

FIG. 1 illustrates an exemplary computer system that can be employed in an operating environment and used to host or run a computer application included on one or more computer readable storage mediums storing computer executable instructions for controlling the computer system, such as a computing device, to perform a process. An example of a computer-implemented process includes a mutable type builder that can be stored in a computer memory and executed with a processor.

The exemplary computer system includes a computing device, such as computing device 100. In a basic hardware configuration, computing device 100 typically includes a processor system having one or more processing units, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), non-volatile (such as read only memory (ROM), flash memory, etc.), or some combination of the two. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network.

Computing device 100 can also have additional features or functionality. For example, computing device 100 may also include additional storage. Such storage may be removable and/or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse, track pad), stylus, voice input device, touch input device (e.g., touchscreen), or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

The present disclosure relates generally to data structures and methods to create data structures used with programming languages in a data processing system such as computing device 100. Aspects of the present disclosure may be embodied as a system, method or computer program product. Accordingly, aspects of the present disclosure may take the form of entirely hardware, entirely software, including firmware, resident software, micro-code, or a combination of software and hardware aspects that may all generally be referred to as a system. Furthermore, aspects of the present disclosure may take the form of a computer program product including one or more computer readable medium or media having computer readable program instruction for causing a processor to carry out the aspects of the disclosure.

Figure 2:
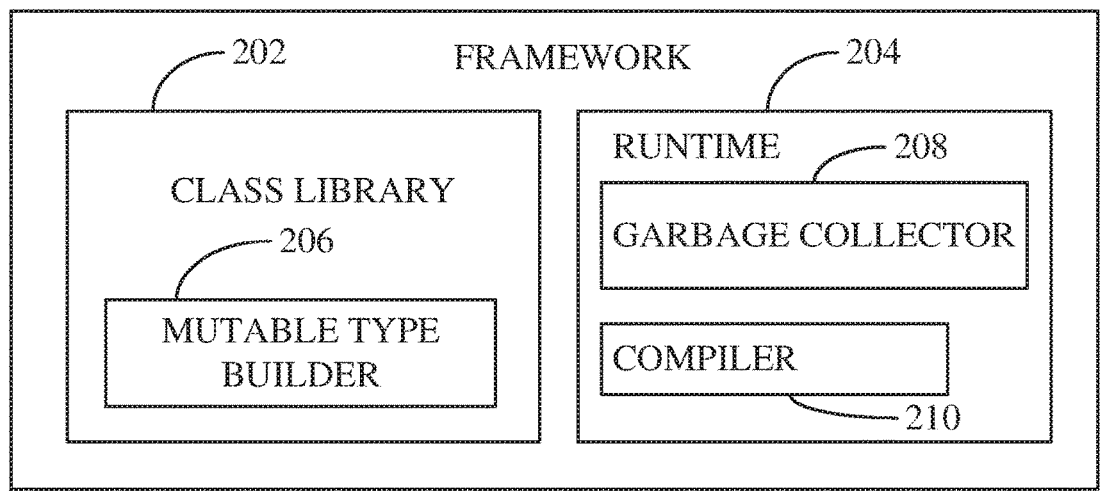
FIG. 2 is a block diagram illustrating an example application framework for execution in the computing device of FIG. 1.

FIG. 2 illustrates features of an example software framework 200 providing a functionality that can be selectively changed with additional developer-written code, such as managed code, which can be implemented on computing device 100. The framework 200 can be used with developer-written software applications created in one or more framework-compatible languages for one or more platforms. Example framework 200 includes a class library 202 having a runtime library and base class library and an application engine such as a runtime system 204 or virtual machine. In one example, the class library 202 includes a set of classes organized by namespace to define features available in a framework-compatible programming language. Software applications written in a framework-compatible language as source code are compiled into a platform-neutral language, or bytecode, that can be executed in a platform-specific virtual machine installed on the platform, such as computing device 100. The runtime system 204 compiles the bytecode into machine code that is executed on the platform. The runtime system 204 can provides additional services including memory management, type safety, exception handling, garbage collection, security and thread management.

Class library 202 of the example can include one or more mutable type builder class or classes 206 implemented in accordance with the methods disclosed. For example, mutable type builder classes can define ArrayBuilder<T> class or StringBuilder class and may implement a generic interface. In one example, classes 206 include a strongly typed array of objects or string that can be accessed by index that provides methods to search, sort, and manipulate the array or string.

In general, a class is an extensible program-code-template, or blueprint, for creating objects, providing initial values for state, and implementations of behavior. The class is a construct that enables a developer to create custom types by grouping together variables of other types, methods and events. Class or classes 206 may include class variables, instance variables, local variables, parameters, user-defined methods, inherited states and behaviors, and interfaces. The variable remains in memory 104 until all references go out of scope. At that time, the runtime system 204 via garbage collector 208 marks the variable as eligible for garbage collection.

Garbage collector 208 automatically manages the allocation and release of memory for the developer-written application. The runtime system 204 allocates a segment of memory 104 to store and manage objects called the managed heap. For each new object, the runtime system 204 allocates memory for the object from the managed heap. As address space becomes occupied on the managed heap, the garbage collector 208 eventually frees some memory. The garbage collector 208 includes an optimizing engine to determine the preferred time or occasion to perform a collection, which can be based upon the allocations being made. The garbage collector 208 checks for objects in the managed heap that are no longer being used by the application and performs the operations to reclaim the memory. Garbage collector 208 in one example is a mark and sweep collector that can find and create a list of all live objects, update references to objects that occupy memory to be compacted, reclaim address space occupied by dead objects, and compact surviving objects. Compacting moves surviving objects toward an older end or generation of the memory segment.

Upon execution of the developer-written program, a platform-specific just-in-time compiler 210 of the runtime system 204 translates the byte code into machine code. The compiler 210 can provide a combination of ahead-of-time compilation and interpretation, and the runtime system 204 can handle late-bound data types and enforce security guarantees.

Figure 3:
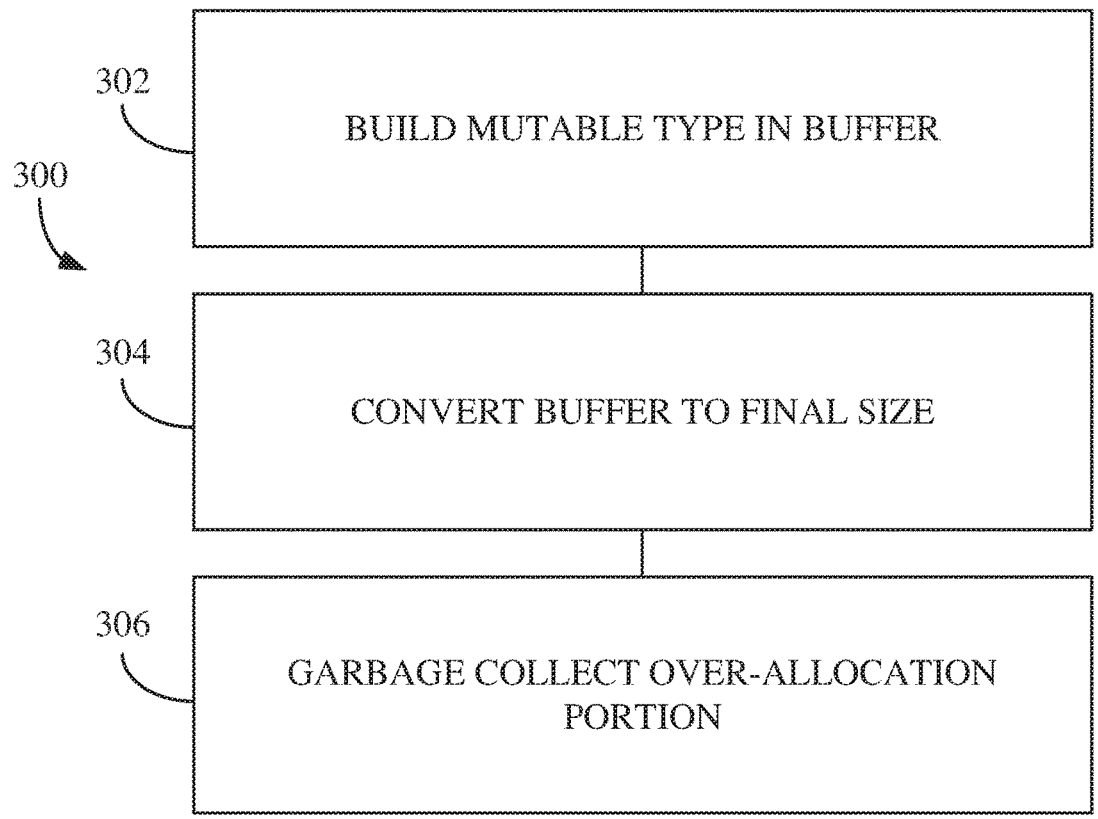
FIG. 3 is a block diagram illustrating an example method of the application framework of FIG. 2.

FIG. 3 illustrates an example method 300 for use with the software framework 200 in building a mutable type in which the number of data elements is not known in advance of the operation. Examples of the mutable type include dynamic arrays and mutable strings. Method 300 can be implemented as class 206. The mutable type is built, which includes adding elements to or removing elements from a buffer, in a building operation at 302. After the mutable type is built, the buffer is converted to a final size at 304. In this example, the mutable type is built in the final allocation of memory and the elements are not subsequently copied into a final allocation of memory. Rather, the unused allocated portions of the buffer are garbage collected at 306.

As an example of building the mutable type at 302, an underlying array of fixed-size is allocated in a contiguous block of memory such as a heap. The amount of memory, or buffer, initially allocated can be a size selected to be larger than the number of elements instantaneously expected to occupy the underlying array. In one example, the extent of memory over allocation can be predetermined and is at least a selected over-allocated amount. The elements of the array are stored, or written, contiguously beginning at the foundation address, and the remaining positions towards the end of the underlying array are reserved, or unused. During the building operation 302, elements can be added (appended or inserted), replaced, or removed into the mutable type. Elements can be removed ore replaced from the mutable type in constant time, as no resizing of the underlying array is required. Also, elements can be added in constant time until the buffer is consumed with the exception of the selected over-allocation amount.

When the allocated contiguous block of memory is consumed with the exception of the selected over-allocated amount, the underlying array is "resized." Resizing includes allocating a new underlying array of a fixed size in a separate buffer, and copying each element from the previous array into the new underlying array. In one example, the size of the new buffer is twice the size of the previous buffer, but other growth factors can be applied. Elements can continue to be added until the buffer is consumed with the exception of the selected over-allocation amount. When the allocated contiguous block of memory is consumed with the exception of the selected over-allocated amount, the process of resizing can be repeated.

Figure 4:
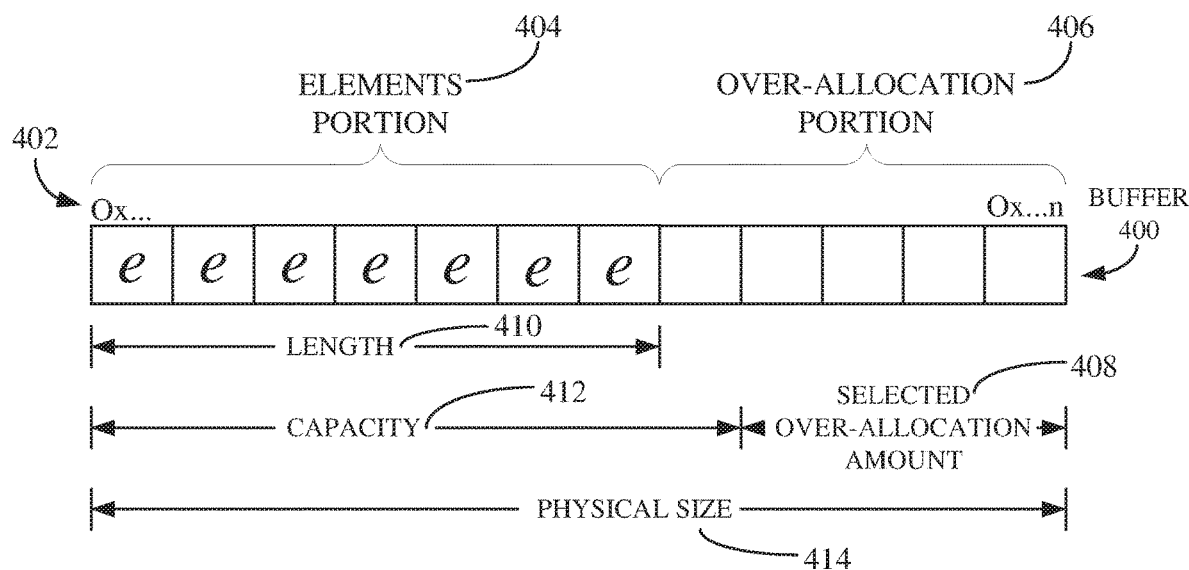
FIG. 4 is a block diagram illustrating an example data structure constructed in accordance with the method of FIG. 3.

FIG. 4 illustrates a data structure 400, or underlying buffer of a mutable type built according to 302. When the building operation is complete, the data structure 400, or underlying array, is in a finally-allocated contiguous section of memory 402. Regardless of whether the underlying buffer was resized during building operation at 302, the finally allocated contiguous section of memory 402 includes an elements portion 404 occupied by index-accessible elements e and an over-allocation portion 406, or unused portion of the data structure 400. In the example, the over-allocation portion has a size of at least selected over-allocation amount 408. The number of elements in the mutable type is the length 410, which is also the value of the elements portion 404. The number of elements e the underlying buffer can include is the capacity 412, and the overall size of the underlying buffer is referred to as the physical size 414. In the example, the physical size 414 includes the capacity 412 and the selected over-allocation amount 408. During building of the mutable type at 302, the underlying buffer will be resized if the length 410 reaches the capacity 412 and thus maintains at least a selected over-allocation amount 410 in unused portion 406 of data structure 400.

Figure 5:
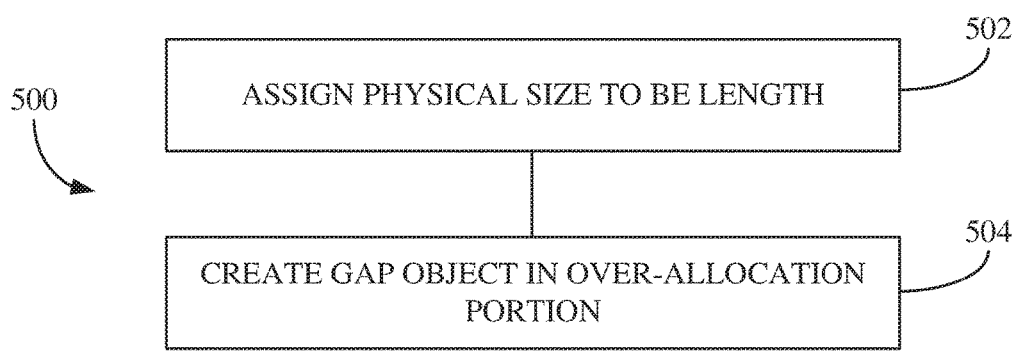
FIG. 5 is a block diagram illustrating an example method of the method of FIG. 3.

FIG. 5 illustrates an example method 500 of converting the buffer to a final size at 304, in which the physical size 414 is reset to be the length 410 of the data structure 400. In one example, method 500 performs an extraction. Converting the buffer to the final size at 304 can be performed in tandem with the runtime system 204 at runtime. The value representing the physical size (the physical size 414 includes the capacity 412 and the selected over-allocation amount 408) of the underlying array buffer (which is generally immutable in many array classes) can be assigned the number of elements in the underlying array (length 410) at 502. The underlying buffer objects changes size, which may invalidate assumptions that the compiler 210 or runtime 204 had made, such as bounds check elimination decisions. Method 500 can invalidate these assumptions by notifying relevant systems or using an underlying representation of the buffer object that prevents these assumptions from being made in the first place.

For example, compiler 210 can model the Length property of List<T> as mutable (because the value grows and shrinks as elements are added and removed). With ArrayBuilder<T> (and similarly with StringBuilder), the compiler 210 can model the underlying array object that ArrayBuilder<T> holds as also being mutable until after the call to method 500 returns.

Also, a compiler optimization based on the length of an array object being immutable can be adjusted. For example, consider the following program:

ArrayBuilder<T> b=new ArrayBuilder<int>(2);
T[ ] extracted=b. Extract( );
Console.WriteLine(extracted.Length==0);

The implementation of the constructor will allocate a backing array with a non zero number of elements. During extraction, the Length property of the array is updated to be zero because no elements were added and the backing array is returned. Compiler 210 would be optimized to understand the length of the underlying buffer created in line one and returned in line two was changed. If the compiler 210 did not understand this, it may incorrectly optimize the above test (extracted.Length==0) to be "false" instead of "true".

A heap gap object can be created in the remaining, or unused portions of the underlying array, or over allocated portion 406, at 504. The heap gap object can be a feature of the garbage collector 208 that is used to mark versions of memory to be freed. In one example, the selected over-allocation amount 408 is the minimum size of the heap gap object, and can depend on various aspects such as the runtime or the garbage collector being employed. In the case of a mark and sweep garbage collector 208, creating the heap gap object 504 can be implemented by logically mimicking the sweep phase.

The remaining, or unused portions of the underlying array can be returned with the garbage collector 208 at 306. In the example, garbage collector 208 can return the heap gap object created at 504.

In one example ArrayBuilder<T> and StringBuilder mutable types can be implemented as a particular kind of value type that prevents it from being copied for improved performance and safety. As a performance aspect, the value type removes a need to allocate an object for the builder itself. As a safety aspect, a copy of the object could provide two logical references to the underlying array that would have a change of size at some point, which could cause type safety issues. On a runtime 204 like the Common Language Runtime of the .Net framework, the mutable type could be a reference types to prevent this sort of copying. In one example, ArrayBuilder<T> is not a subclass of Array<T>.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A computing device implemented method for building a mutable type in a heap, the method comprising:
   generating a data structure for a developer written program from a class library, the data structure having a contiguous section of memory, the contiguous section of memory of the data structure having an element portion and an over-allocation portion, the element portion storing elements accessible with an index, the elements stored in the data structure with the exception of the over-allocation portion;
   resizing the data structure within the heap into a final allocation of memory when the contiguous section of memory is consumed with the elements with the exception of the over-allocation portion as unused portion of the data structure;
   inserting a gap object into the over-allocation portion of the data structure in the final allocation of the memory to mark a version of memory to be freed; and
   garbage collecting the gap object for a final size of the data structure.

2. The method of claim 1 wherein the over-allocation portion includes at least a selected over-allocation amount.

3. The method of claim 1 wherein the contiguous section of memory is in a managed heap.

4. The method of claim 1 wherein the data structure includes an array.

5. The method of claim 1 comprising assigning a length property of the data structure to include the element portion and not the over-allocation portion.

6. The method of claim 1 wherein the mutable type is a string type.

7. The method of claim 1 wherein the mutable type is an array type.

8. The method of claim 1 wherein garbage collecting includes applying a mark and sweep garbage collector.

9. The method of claim 8 wherein the gap object logically mimics a sweep phase.

10. A system to build a mutable type in a heap, the system comprising:
    a memory device to store a set of instructions; and
    a processor to execute the set of instructions to:
      provide a data structure for a developer written program from a class library, the data structure including an-allocated contiguous section of memory in the heap and having a length, the data structure having an elements portion and an over-allocation portion, the over-allocation portion having at least a selected amount;
      provide a number of index-accessible elements into the elements portion, the elements stored in the data structure with the exception of the over-allocation portion;
      resize the data structure within the heap into a final allocation of memory when the contiguous section of memory is consumed with the elements with the exception of the over-allocation portion into a finally allocated contiguous section of memory as unused portion of the data structure;
      update the length to be the number of index-accessible elements;
      insert a gap object into the over-allocation portion of the data structure in the final allocation of the memory to mark a version of memory to be freed; and
      garbage collect the gap object in the over-allocation portion of the finally-allocated contiguous section of memory to generate a fixed size data structure in the finally-allocated section of memory.

11. The system of claim 10 wherein the set of instructions are included in a runtime system.

12. The system of claim 11 wherein the runtime system includes a virtual machine.

13. The system of claim 10 wherein the heap includes a managed heap.

14. The system of claim 13 comprising inserting a heap gap object into the over-allocation portion.

15. The system of claim 14 wherein the heap gap object is garbage collected.

16. The system of claim 10 wherein the set of instructions includes a strongly typed array or string from the class library.

17. A computer readable storage device comprising:
    memory to store computer executable instructions to control a processor to build a mutable type in a heap by:
      generating an array structure for a developer written program from a class library, the array structure in a contiguous section of memory and having a mutable length property including an elements portion and an over-allocation portion, the elements stored in the data structure with the exception of the over-allocation portion;
      writing a number of elements into the elements portion;
      assigning the length property to be the number of elements;
      resizing the array structure within the heap into a final allocation of memory when the contiguous section of memory is consumed with the elements with the exception of the over-allocation portion as unused portion of the data structure;

inserting a gap object into the over-allocated portion in the final allocation of the memory to mark a version of memory to be freed; and garbage collecting the gap object of the finally-allocated contiguous section of memory to generate a fixed size data structure in the finally-allocated section of memory.

18. The computer readable storage device of claim 17 wherein the over-allocation portion includes at least a selected amount greater than the number of elements.

19. The computer readable storage device of claim 17 wherein the mutable type includes an array type or a string type.

20. The computer readable storage device of claim 17 wherein writing a number of elements includes adding or removing elements into a buffer in a finally allocated contiguous section of a managed heap.

* * * * *